United States Patent Office 3,442,431
Patented May 6, 1969

3,442,431
FRICTION WELDING INTERNALLY BORED MEMBERS
Wilmer E. Funk, Roanoke, Gerald B. Koch, East Peoria, and Ralph W. Yocum, Peoria, Ill., assignors to Caterpillar Tractor Co., Peoria, Ill., a corporation of California
Filed Sept. 1, 1967, Ser. No. 664,970
Int. Cl. B23k 27/00
U.S. Cl. 228—2                    5 Claims

ABSTRACT OF THE DISCLOSURE

Apparatus for friction welding internally bored workpieces wherein the apparatus is provided with an internal pilot assembly having pilot means adapted to fit inside each internally bored workpiece to prevent radial shifting between said workpieces, said pilot assembly having bearing means to permit relative rotation between said pilot means without radial shifting therebetween.

BACKGROUND OF THE INVENTION

This invention relates to improvements in friction bonding of the general type wherein two workpieces are subjected to relative rotation while in rubbing contact with each other to generate frictional heat to raise the workpieces to a suitable welding temperature whereupon the relative rotation subsides and the workpieces become welded or bonded together.

It is also to be understood that the invention is specifically applicable to the inertia welding process. In the inertia welding process the energy required to bring the common interface of the parts to a bondable condition is stored as kinetic energy in rotating inertia weights. These weights generally take the form of flywheels and are connected to one of the parts and the entire energy necessary to form the bond is stored in the weights prior to engagement of the parts at the interface. The stored energy is discharged into the interface through frictional heating and plastic working developed at the interface as the rubbing contact slows the rotating weights to a stop at the conclusion of the bonding cycle.

This application is particularly directed to friction welding apparatus having an internal pilot assembly for the friction welding of members having internal bores.

When attempts are made to friction weld workpieces having internal bores such as cluster gears, track rollers, etc., the workpieces will invariably shift radially and consequently will not be aligned or concentric after the welding operation is completed. Misalignment is a severe problem in the friction welding of such parts and it is the principal object of this invention to provide apparatus which will minimize these misalignment problems and thereby make the friction welding process an attractive method for joining internally bored parts which have been previously joined or manufactured by other methods.

The pilot assembly of the present invention is precisely machined and fits extremely close to the internal bore of each of the workpieces to be welded. Because of this close proximity to the internal bore of each of the workpieces, the pilot restricts radial movement between the workpieces so that the weld pieces remain aligned during and after welding. As a result of the good alignment obtained through the use of such a pilot assembly, much of the final machining of the weld parts can be done before welding, and in most cases, no machining is required to square or align parts after welding. After the welding operation is completed the pilot may be removed from the parts and another set of parts positioned for welding using the same pilot assembly.

Other objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE PREFERRED EMBODIMENTS

Figure 1:
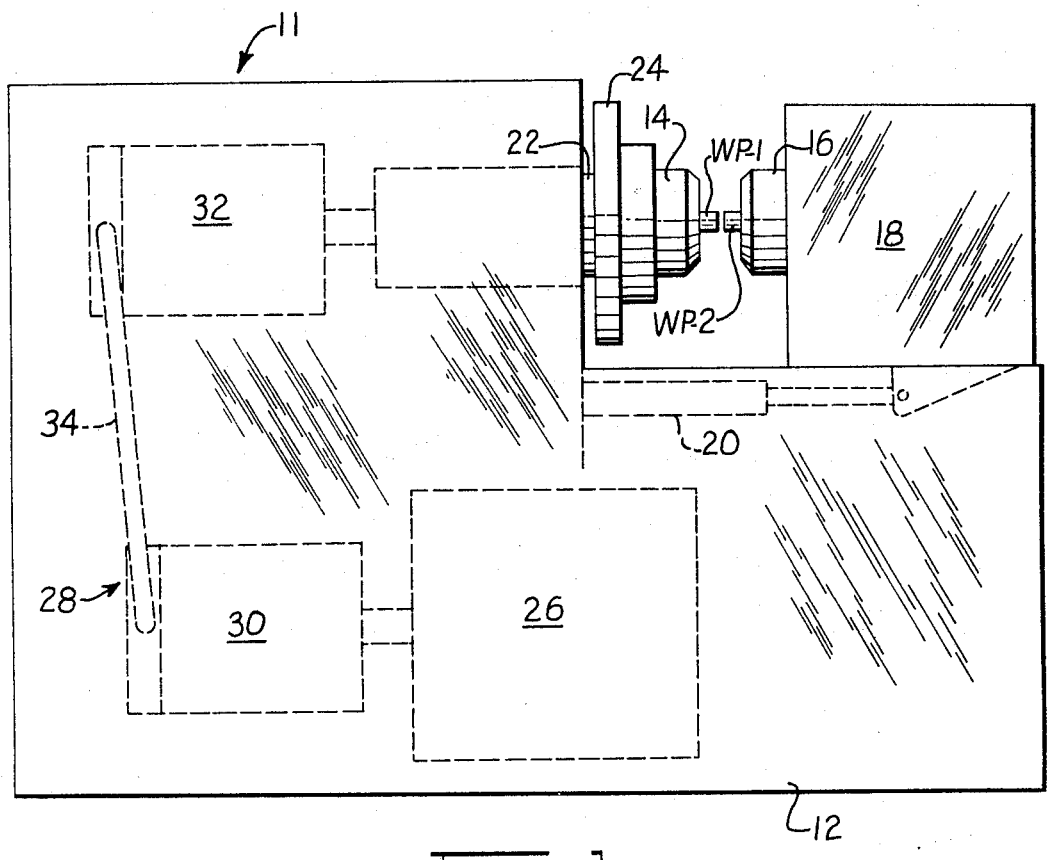
FIG. 1 is a side elevation illustrating one embodiment of a friction welding machine having apparatus constructed in accordance with the present invention.

A friction welding machine constructed in accordance with one exemplary embodiment of the present invention is indicated generally by the reference numeral 11 in FIG. 1. As shown, the machine comprises a frame or housing structure generally denoted at 12 for housing the various elements of the machine. The two parts to be welded, workpieces WP-1 and WP-2, are mounted within chucks 14 and 16. For purposes of this particular application, it is to be understood that the workpieces WP-1 and WP-2 have internal bores such as would be found for example in cluster gears, track rollers, etc.

The chuck 16 does not rotate and is mounted on a tailstock fixture 18. The fixture 18 is mounted for axial movement on the machine frame 12 under the control of a load cylinder 20. A pressure control circuit, not shown, regulates the pressure in the load cylinder, and thus determines the force with which the parts WP-1 and WP-2 are engaged.

The chuck 14 is mounted on a spindle 22 and the chuck and spindle are mounted for rotation within the frame 12. The rotary spindle 22 is adapted to receive flywheels 24 which may be of various size and mass depending upon the particular application of the machine.

An electric motor 26 rotates the spindle through a hydrostatic transmission indicated generally by the reference numeral 28. The hydrostatic transmission includes a hydrostatic pump 30, a hydrostatic motor 32, and a manifold 34 between the pump and motor.

The drive ratio between the motor and the spindle 22 can be varied by changing the cam angles in either the pump 30 or the motor 32 and the pump and motor can be used to effectively disconnect the motor 26 from the spindle 22 by moving the cam and the pump 30 to a position in which the pump 30 does not displace any hydraulic fluid to the motor 32.

It is to be understood that the flywheel weights 24 are mounted on the spindle 22 so that the welding machine 11 can be operated as an inertia welding machine as described in U.S. Patent No. 3,273,233 and as described in further detail below.

A welding operation to join two internally bored workpieces can be performed by operating the machine in the following general manner. One of the internally bored workpieces WP-1 is firmly clamped in the rotatable chuck 14 located on the spindle 22. The other internally bored weld piece WP-2 is firmly clamped in the nonrotatable chuck 16 which is located on the tailstock portion 18 of the machine. At this juncture a pilot assembly which will be described in much greater detail below is placed inside the internal bore of one of the workpieces WP-1 or WP-2. The ram mechanism 20 is then operated to move the workpieces WP-1 and WP-2 to a position where they are very close to each other so that the pilot assembly fits into the internal bore of each of the workpieces. Upon actuation of the motor 26, the flywheel and workpiece WP-1 are accelerated to a predetermined velocity.

Once the predetermined velocity has been obtained, the motor 26 is disconnected or shut down and the ram mechanism is actuated to move tailstock portion 18 and workpiece WP-2 into contact with the rapidly rotating workpiece WP-1. As the two workpieces are brought into contact under the upsetting pressure applied through ram 20, heat is generated at the contacting surfaces or interface of the weld pieces. This heating increases until the workpieces reach the weld temperature at which time the upsetting pressure, applied by the ram 20 at either a constant or varying pressure, causes flashing or upsetting to occur. During this heating and flashing, the rotational velocity of the spindle member 22 has continued to decrease. At the time the rotation of the spindle ceases, upsetting has taken place and the weld is completed.

Figure 2:
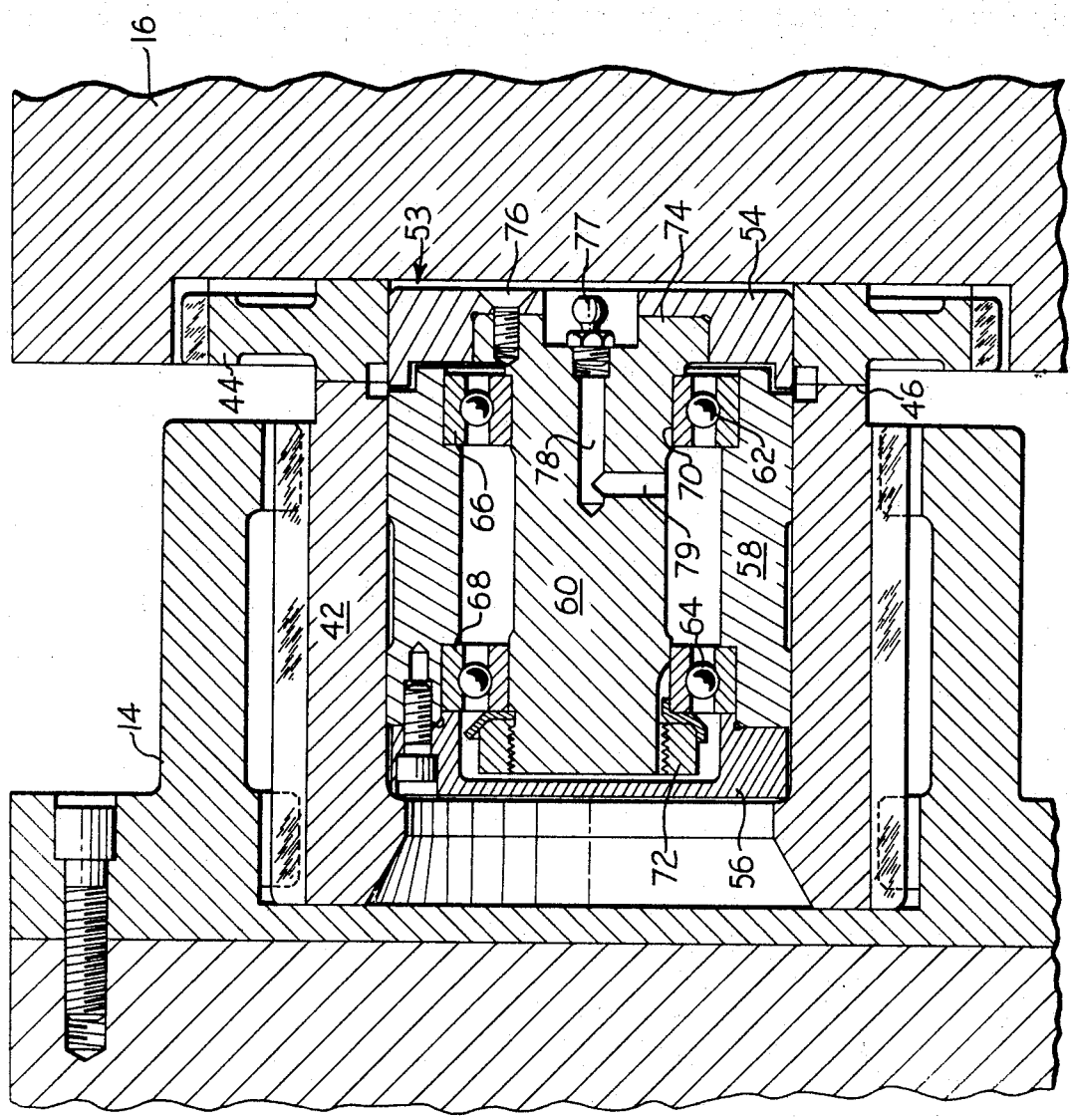
FIG. 2 is a sectional view illustrating one embodiment of a multi-part pilot assembly constructed in accordance with the present invention.

FIG. 2 illustrates one embodiment of a pilot assembly which is provided with pilot means which fit very close to the internal bore in each of the workpieces to be welded. One member to be welded, for example, a gear 42, is securely held in the rotating chuck 14 while the other member to be welded, here a second gear 44, is securely held in the nonrotating chuck 16. The welding takes place between two workpieces at the area denoted by reference numeral 46.

The pilot assembly illustrated generally at 53 in FIG. 2 comprises an upper cap 54, a lower cap 56, a hollow sleeve 58 and a solid pin 60. A pair of bearings 62 and 64 are assembled against shoulders 66 and 68 formed internally at opposite ends of the hollow sleeve 58. An annular shoulder 70 is formed on the pin 60 and abuts the inner race of bearing 62 and a spanner nut 72 retains the inner race of bearing 64 while the cap 56 retains the outer race of bearing 64 against the shoulder 68. Lubrication of the bearings is accomplished through a fitting 77 threaded into a passageway 78 in pin 60 which intersects a transverse passageway 79.

The cap 54 is received on a head portion 74 of pin 60 and retained there by machine screws 76. The outer diameters of cap 54 and sleeve 58 serve as separate pilot means for each workpiece and are machined to very close tolerances (approximately 0.0005 to 0.0015 loose) to provide an extremely small gap between themselves and the mating internal bores of the workpieces to be bonded which are here represented by the gears 42 and 44.

With the arrangement shown in FIG. 2, it will be readily understood that the pilot assembly shown therein effectively prevents any appreciable amount of radial shifting between the workpieces 42 and 44 while they are being bonded to each other. At the same time, however, the pilot assembly also allows relative rotation between the the sleeve 58 and pin 60 so that the friction welding operation can be carried out should the workpieces attempt to shift radially and come into contact with the outer diameter pilot means on cap 54 and sleeve 58.

It is recognized that other means may be employed to allow relative rotation between the piloting surfaces located on the pilot assembly.

Figure 3:
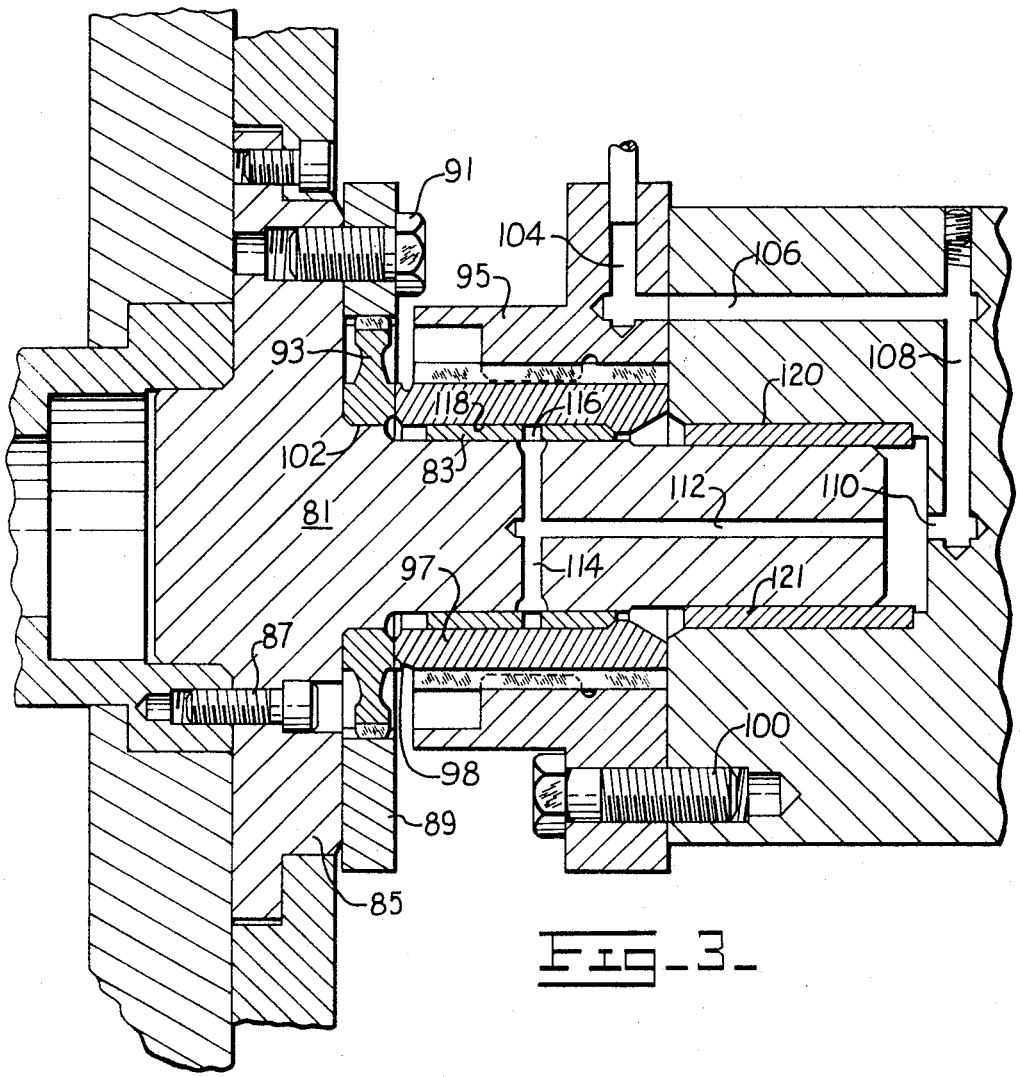
FIG. 3 is a sectional view illustrating another embodiment of a multi-part pilot assembly constructed in accordance with the present invention.

FIG. 3 illustrates another type of internal pilot assembly and consists mainly of a heavy pin member 81 and a bushing 83, which is preferably a bronze bushing, press-fitted to the pin member 81. The pin is provided with an externally flanged area 85 which receives a plurality of cap screws 87 for fastening the pin to the rotating portion of the machine.

A driving plate 89 is fastened to the flange portion 85 of pin 81 with a plurality of cap screws, one of which is shown at 91. The driving plate 89 holds an internally bored workpiece 93 which is rapidly rotated during a welding operation.

In a similar manner, a chuck-like member 95 fixedly holds a second internally bored workpiece 97 against rotation during the welding operation so that welding occurs in the area denoted at 98. A plurality of cap screws, one of which is shown at 100 are utilized to fasten the chuck member 95 to an axially movable tailstock portion of the machine such as shown at 18 in FIG. 1.

The internal bore of the rotating weld piece 93 fits to a closely machined shoulder 102 formed on the pin 81. The bronze bushing 83 is closely machined to the dimensions of the internal bore of the stationary weld piece 97. Just enough clearance is provided to allow lubrication between the rotating bronze bushing and the nonrotating weld piece 97. Lubrication is provided by a pressure system (not shown) which first forces the lubricant through passages 104, 106, 108 and 110 formed in the nonrotating machine members. The lubricant may then enter the pin member 81 and travel through passageways 112 and 114 formed in the pin member and then through the bore 116 formed in the bushing 83 to finally reach the area 118 between the rotating bushing 83 and the nonrotating weld piece 97.

Another bronze bushing 120 is press-fitted into the tailstock portion of the machine such that one end of the pin member 81 may closely fit into the inner bore of the bushing 120. This provides rigidity and support for the end of the pin 81 during the welding operation. The surface area 121 between the rotating pin 81 and the nonrotating bushing 120 is provided with lubrication through the previously mentioned ports 104, 106, 108 and 110.

Although the inner bores of the weld pieces shown in FIGS. 2 and 3 are depicted as having inner diameters of the same dimension, it is to be recognized that the invention is not limited to such applications. A pilot assembly constructed in accordance with the present invention may be machined to accommodate weld pieces having inner bores whose inner diameters are widely different in size.

We claim:

1. Friction welding apparatus for bonding a first internally bored workpiece to a second internally bored workpiece, said apparatus comprising, a first rotatable chuck having means for holding said first workpiece for rotation therewith, means for rotating said rotatable chuck, a second chuck having means for fixedly holding said second workpiece, means for axially moving said chucks toward and away from each other, an internal pilot assembly for aligning said workpieces during a welding operation, said pilot assembly comprising, a pin member adapted to extend into the internal bore of each workpiece when said workpieces are held in said chucks, first piloting means associated with said pin for preventing radial shifting of said first workpiece, second piloting means associated with said pin for preventing radial shifting of said second workpiece, and bearing means associated with said pin to permit relative rotation between said first and second pilot means without radial shifting therebetween.

2. Apparatus as set forth in claim 1 wherein one of said piloting means comprises a sleeve member surrounding said pin and wherein said bearing means are interposed between said sleeve and said pin to permit relative rotation between said sleeve and pin.

3. Apparatus as set forth in claim 2 wherein said pin is provided with internal passageways for supplying lubrication to said bearing means.

4. Apparatus as set forth in claim 1 wherein one of said piloting means comprises a bushing closely fitted to said pin to prevent relative rotation between said pin and said bushing and wherein the external diameter of said bushing is sized to the internal bore of the workpiece associated therewith to permit relative rotation between said bushing and said workpiece without radial shifting therebetween.

5. Apparatus as set forth in claim 4 wherein said pin and bushing are provided with passageways for providing lubrication between said bushing and the workpiece associated therewith and wherein said bushing is a bronze bushing.

References Cited

UNITED STATES PATENTS 3,175,284   3/1965   Cotovsky _____ 29—470.3

FOREIGN PATENTS 648,110   9/1962   Canada.

RICHARD H. EANES, JR., *Primary Examiner.*

U.S. Cl. X.R.

29—470.3